United States Patent [19]

Ortloff et al.

[11] 4,031,919
[45] June 28, 1977

[54] ARTICULATED RISER

[75] Inventors: John E. Ortloff; Alfred S. Arcache; Robert E. Haring, all of Houston, Tex.

[73] Assignee: Exxon Production Research Company, Houston, Tex.

[22] Filed: Aug. 18, 1975

[21] Appl. No.: 605,588

Related U.S. Application Data

[63] Continuation of Ser. No. 186,881, Oct. 6, 1971, abandoned.

[52] U.S. Cl. .................................. 137/799; 61/86; 285/137 R; 138/111
[51] Int. Cl.² ........................................ F17D 1/08
[58] Field of Search ........... 137/236, 799; 285/137; 61/46, 72.3; 138/106, 110, 111, 120; 9/8 P; 114/230; 141/204, 279, 387, 388

[56] References Cited

UNITED STATES PATENTS 3,461,916   8/1969   Ledgerwood ................. 138/120
3,701,551   10/1972  Morgan ...................... 285/137 R Primary Examiner—Harold W. Weakley
Attorney, Agent, or Firm—William K. Guest

[57] ABSTRACT

An articulated riser including at least two framed structures comprised of a plurality of fluid-handling lines connected by multiple fluid-handling line flexible joints. The articulated riser of the present invention provides a system wherein fluid-handling lines may be connected between a structure on the subsea bottom and a floating vessel either for the production of crude oil and natural gas offshore, or for the operational functions before or after producing a subsea well, or any combination thereof. The articulated riser of the present invention may extend to a foundation structure situated on the subsea bottom or to an upright self-standing riser, providing a manifold for a plurality of fluid-handling lines to be connected to a floating vessel. Means may be provided for either partially or substantially totally providing buoyancy for the articulated riser.

9 Claims, 5 Drawing Figures

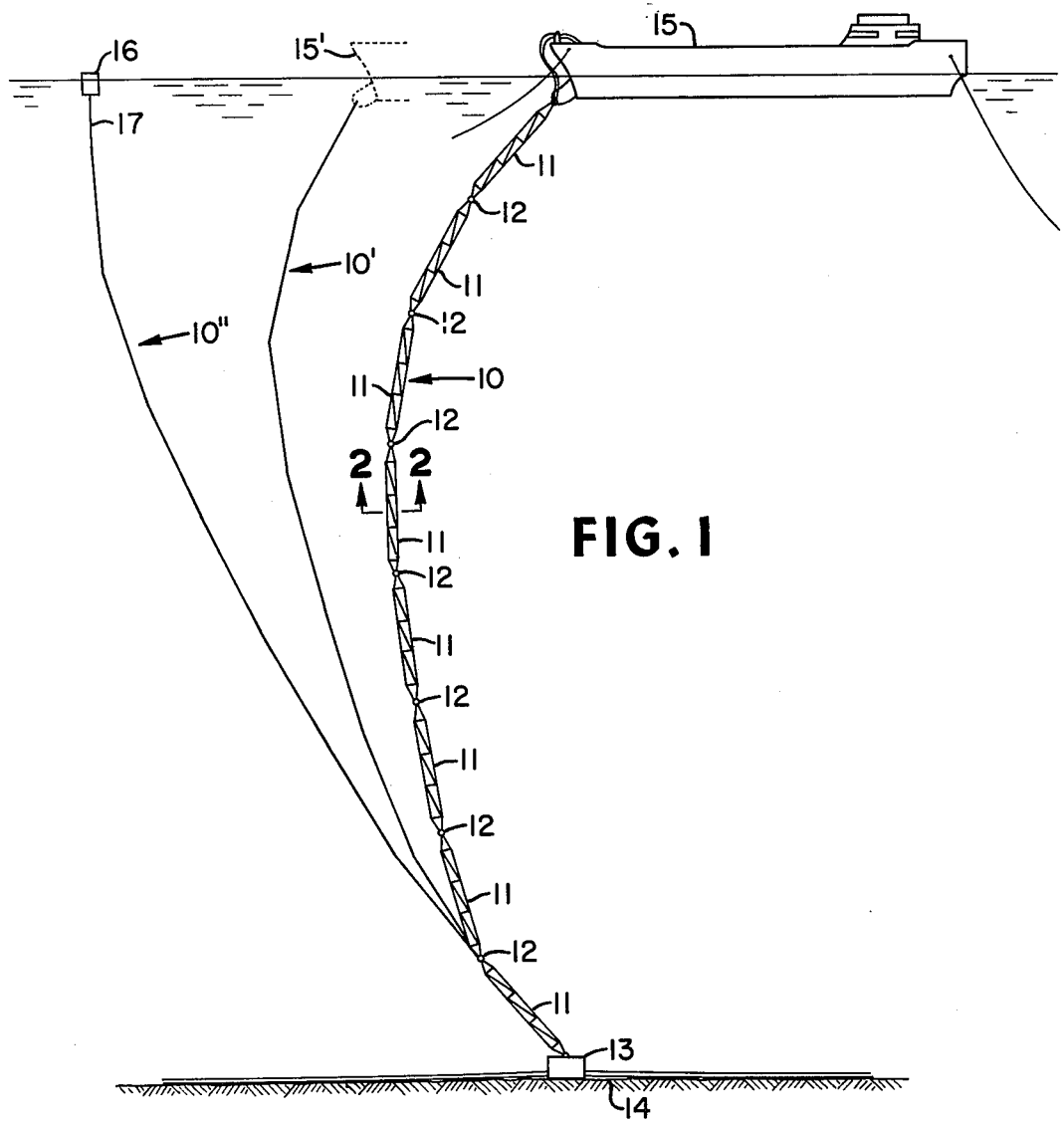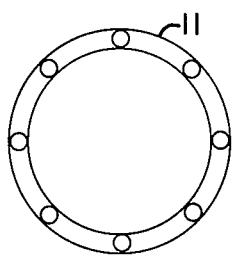

JOHN E. ORTLOFF
ALFRED S. ARCACHE
ROBERT E. HARING
INVENTORS

BY

*James E. Gilchrist*

ATTORNEY

# ARTICULATED RISER

CROSS-REFERENCE TO RELATED APPLICATIONS

This application is a continuation of application Ser. No. 186,881, filed Oct. 6, 1971, and now abandoned.

BACKGROUND OF THE INVENTION

1. Field of the Invention

The present invention is directed to an articulated riser which extends from an underwater installation toward the water surface. The present invention is directed to an articulated riser which includes at least two framed structures comprised of a plurality of fluid-handling lines and multiple fluid-handling line flexible joints connected between the framed strutures.

2. Prior Art

In the search for crude oil and natural gas in deeper and deeper waters, a need has arisen wherein large volumes of fluids can be transferred between subsea installations and the water surface. It becomes economically unfeasible to provide fixed platforms which extend above the water surface which can extend to the depths at which the search for crude oil and natural gas is now being carried out. One approach suggested for extending multiple fluid-handling lines from subsea installations to the surface in deep water production operations is to house the lines in a self-standing riser consisting of a long, slender column that may be pivoted at the bottom and buoyant at the top so as to extend upwardly from the subsea bottom toward the surface of the water. Such a riser when rigidly attached to a vessel at the water surface is subject to being overstressed from currents, vessel offset, or vessel motion. A need, therefore, exists for a riser that is flexible enough to tolerate the motions of the vessel on the water surface and that will withstand the loads imposed by deep water conditions.

SUMMARY OF THE INVENTION

The present invention may be briefly described as an articulated riser. More particularly, the present invention is directed to a marine riser which is comprised of at least two elongate structural members situated in end-to-end relation and arranged in a substantially vertical orientation Each of the structural members includes at least three rigid, fluid-handling lines that extend the length thereof and are rigidly affixed thereto. A universal joint connects each adjacent pair of elongate structural members and serves to transfer axial loads therebetween. At least three flexible fluid-handling lines extend across each universal joint and interconnect corresponding rigid, fluid-handling lines situated in the adjacent elongate structural members.

The flexible fluid-handling lines are preferably comprised of swivels in combination with rigid fluid-handling lines and flexible hoses. The riser apparatus preferably also includes a foundation structure situated on the floor of the body of water and a universal joint interconnecting the foundation structure and the lowermost elongate structural member and transferring axial loads therebetween. The apparatus may further include a vessel connected to the uppermost elongate structural member.

BRIEF DESCRIPTION OF THE DRAWINGS

FIG. 1 is a schematic view of an articulated riser of the present invention in combination with a foundation structure situated subsea and a moored vessel.

FIG. 2 is a cross section of one of the framed structures making up an articulated riser of the present invention.

DESCRIPTION OF THE PREFERRED EMBODIMENTS

Figure 3:
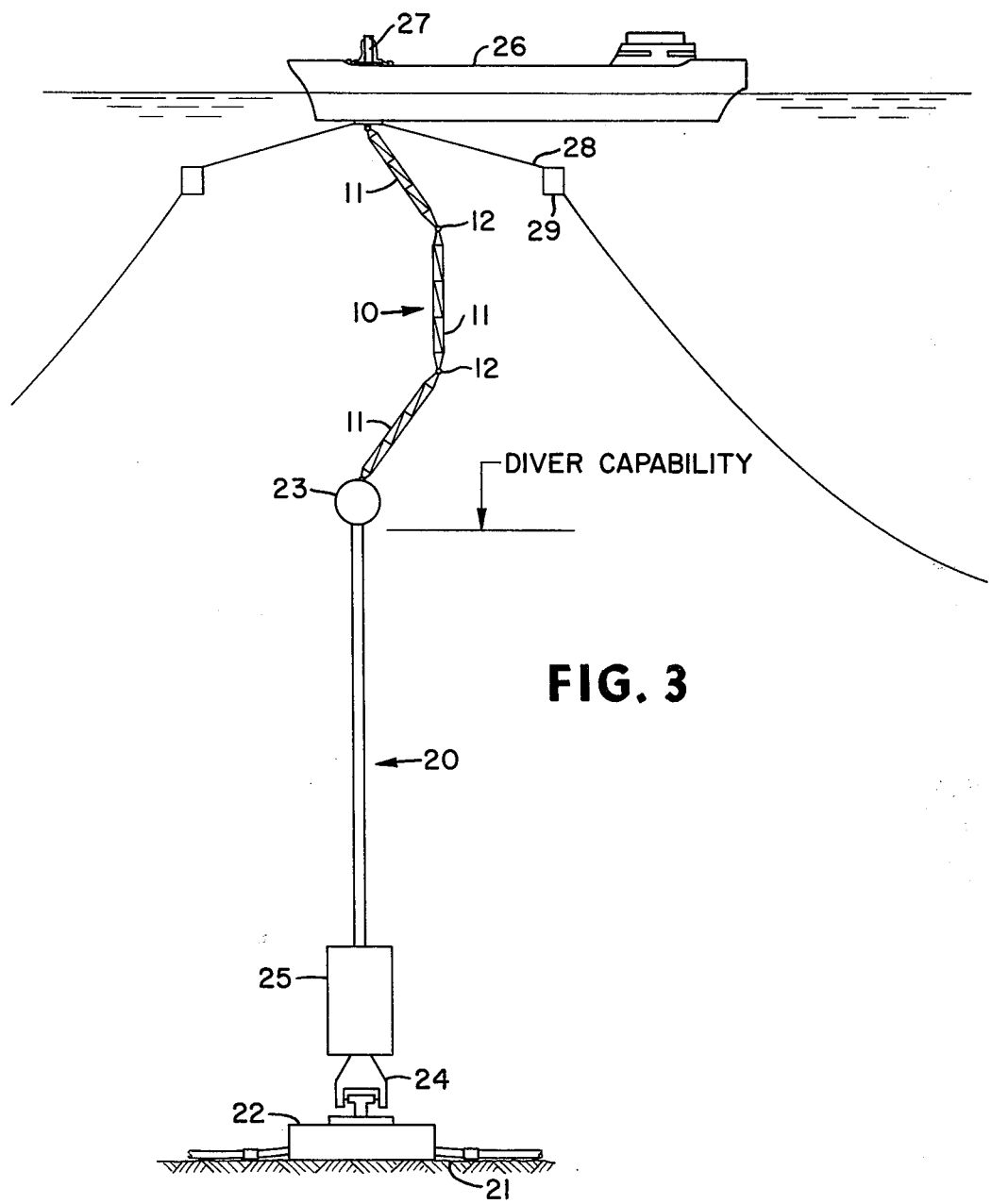
FIG. 3 is a schematic view of an articulated riser of the present invention in combination with a self-standing riser and connected to a vessel having a turret mount.

Referring to FIG. 1, an articulated riser 10 of the present invention may extend essentially from the subsea surface to a floating vessel. The articulated riser 10 is made up of a plurality of framed structures 11 with multiple fluid-handling line flexible joints 12 between the framed structures 11. An articulated riser 10 of the present invention is made up of any number of framed structures 11, but consists of at least two framed structures 11 with the multiple fluid-handling line flexible joints 12 connected therebetween.

As shown in FIG. 1, the articulated riser 10 extends from a foundation structure 13 situated on the subsea floor 14. The foundation structure 13 may be a manifold structure wherein a plurality of fluid-handling lines come to a single point either for the collection of oil or gas lines, or flow lines to wells, storage, pipelines, or for any other purpose in the production of crude oil or natural gas. The other end of the articulated riser 10 is connected to a spread-moored vessel 15.

As illustrated in FIG. 1, the articulated riser 10 has sufficient flexibility so as to compensate for the movement of the vessel 15 caused by waves, wind, currents, tides, changes in draft, or any other force that might act on the vessel 15. This is shown as represented by the articulated riser position 10' and the vessel 15'. Hence, the articulated riser 10 of the present invention permits the vessel 15 to move within substantial excursion limits of the mooring system. Furthermore, the articulated riser 10 will have sufficient structural strength to withstand the static and dynamic loads imposed by wave action and currents. If rough sea conditions make it necessary, the articulated riser 10 may be released to permit moving the vessel 15 to safety. When the articulated riser 10 is released, a buoy 16 on a line 17 attached to the upper portion of the articulated riser, shown at 10'', marks its position and may provide support therefor. The upper framed structures 11 of the articulated riser 10 may be provided with sufficient buoyancy so that the upper end of the articulated riser 10 is easily accessible once it has been released from the vessel 15.

The framed structures 11 are composed of a plurality of fluid-handling lines. As shown in the cross section of FIG. 2, for example, there are eight fluid-handling lines. While the fluid-handling lines preferably serve also as structural members of the frame, it will be apparent that separate structural members could be provided so that the fluid-handling lines would not be load-bearing members. These fluid-handling lines may be of any inside diameter and either all the same diameter or varying diameters, depending on the type of fluid-handling requirements for the particular line. Preferably, the fluid-handling lines will have constant bore diameter throughout the length of the articulated riser so as to permit passage of cleaning pigs or other tools as required. The inside diameters of the fluid-handling lines may range from one-half to twelve inches or greater, and each of the fluid-handling lines in the framed structures may be as long as fifty feet or greater. In fact, lengths of two hundred feet or more are contemplated. The fluid-handling lines in the framed structures need not number eight or be in a circular configuration as shown in FIG. 2, but may take on any number or configuration.

In FIG. 3, the articulated riser 10, made up of the framed structures 11 connected with the multiple fluid-handling line flexible joints 12, is illustrated in combination with a self-standing riser 20. The self-standing riser 20 is a structure situated at the subsea floor 21 and providing a means for collecting a number of fluid-handling lines that extend within the structure from the base 22 on the subsea floor 21 to a buoyancy chamber 23 that maintains the self-standing riser 20 in upright position. The buoyancy chamber 23 is preferably above a depth where a diver could easily reach, and would provide for ease in attaching the articulated riser 10 of the present invention. The specific self-standing riser 20 shown in FIG. 3 has a flexible connection 24 to the base 22. The riser 20 also has a weight 25 that relieves the vertical force on the base 22 resulting from the large buoyancy chamber 23. However, it is understood that a self-standing riser with a rigid base may also be utilized. To further illustrate the invention, the vessel 26 has a turret mount 27 to which the upper end of the articulated riser 10 is attached. The purpose of the turret mount 27 is to provide a means to maintain the articulated riser in a position that will prevent rotation of the articulated riser 10 while the ship or vessel 26 may move about the turret mount 27. Mooring lines 28, including spring buoys 29, extend from the turret mount 27 to the submerged bottom and permit the vessel 26 to rotate without disturbing the mooring. The spring buoys 29 provide a positive vertical force component tending to reduce shock loads and provide additional restoring force to maintain vessel position. They also help to prevent contact between the mooring lines 28 and the articulated riser.

Figure 4:
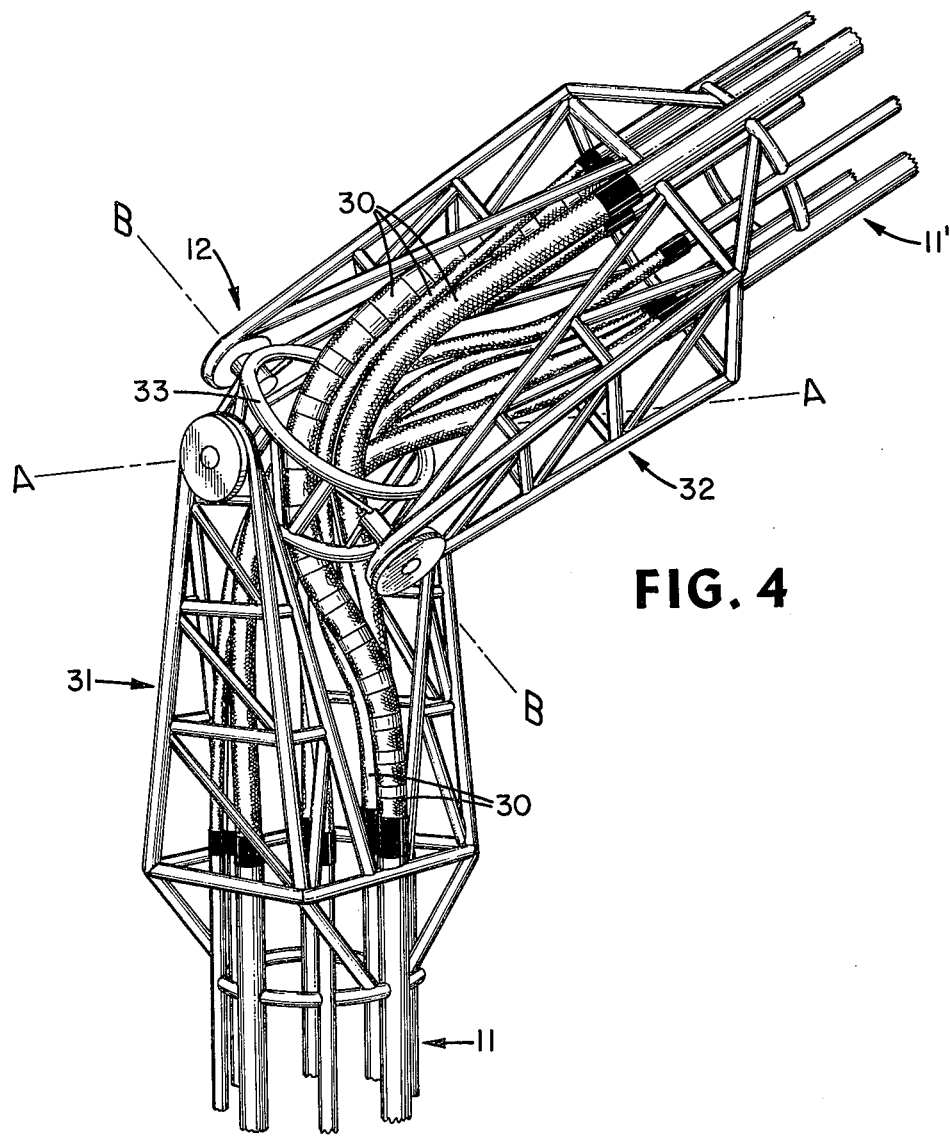
FIG. 4 is one embodiment of a multiple fluid-handling line flexible joint.

Referring to FIG. 4, there is disclosed one embodiment of a multiple fluid-handling line flexible joint 12 which connects two of the framed structures 11. The flexible joints 12 are the key to the articulated riser system of the present invention. As stated before herein, the framed structures 11 are comprised of a plurality of fluid-handling lines. These lines may be of varying sizes, but would be structured together in lengths of fifty feet or more, and require some flexibility between segments to permit substantial excursions and to overcome the very large moments and forces that are placed on any rigid structure. Preferably, the flexible joint 12 is a universal joint and, according to the embodiment of FIG. 4, utilizes flexible hose 30 to connect the rigid fluid-handling lines of one framed structure 11 to corresponding rigid fluid-handling lines in another framed structure 11'. In the embodiment of FIG. 4, the joint 12 comprises a U-shaped structure 31 attached to one end of the framed structure 11. A corresponding U-shaped structure 32 is attached to one end of the framed structure 11'. The U-shaped structures 31 and 32 are positioned 90° to one another and are attached to a crossmember having an aperture therethrough shown as ring 33. The attachment of U-shaped member 31 to the ring 33 is about an axis A—A such that there is essentially 180° movement. The U-shaped structure 32 is attached to the ring 33 at points through an axis B—B, again for essentially 180° movement. The axis A—A is preferably 90° to axis B—B since this arrangement of the axis permits flexure in any direction. It has been found that it is preferred that the flexible hoses 30 be spiraled from one framed structure 11 to connect the corresponding fluid-handling lines in framed structure 11' from a position that is geometrically opposite. This means that the fluid-handling lines 30 will spiral from a position in one framed structure to another over at least a range of 140° to 220° through the spiral. When there are an even number of fluid-handling lines making up the framed structure 11, the amount of spiral is preferably directly opposed, or 180°.

In the embodiment of FIG. 5, again one framed structure 11 is connected by means of a flexible joint 12 to the end of another framed structure 11'. In this embodiment, a crossmember having an aperture therethrough shown as ring 40 provides a manifold section for the number of fluid-handling lines. A U-shaped structure 41 is attached to one end of a framed structure 11. Likewise a similar U-shaped structure 42 is attached to one end of the framed structure 11'. As shown in this embodiment, the U-shaped structure may be made up of several individual elements 43, 44 and ring 45, all making the U-shaped structure 41, and ring 45 may be part of the framed structure 11 or a separate member making up the U-shaped structure 41. The U-shaped structure 41 is attached to the ring 40 so as to rotate at axis A—A. The U-shaped structure 42 is attached to ring 40 at a different plane so as to rotate around axis B—B which is preferably perpendicular to axis A—A. While the U-shaped structures 41 are shown in different planes, they may be attached to the ring 40 so that the axes A—A and B—B are in the same plane but perpendicular to each other. To provide flexibility in the fluid-handling lines, the lines may be extended from the framed structure 11 to the axis A—A wherein swivels 46, aligned on axis A—A provide rotational capability about axis A—A and connect the lines to their corresponding fluid-handling line in the ring 40. Likewise swivels 47 are provided to obtain the desired rotational capability around axis B—B. The use of swivels 46 and 47 allow the fluid-handling lines extending through the flexible joint 12 to be made out of metal instead of a flexible material; however, flexible hoses may be utilized as in the embodiment of FIG. 4 wherein the fluid-handling lines extending through the flexible joint 12 would be of sufficient length and flexibility for the desired rotational capability about axis A—A or axis B—B. The flexible fluid-handling lines would extend from the ring 45 in U-shaped structure 41 to a fixed steel manifold in ring 40 and, similarly, from ring 49 in U-shaped structure 42 to the fixed steel manifold in ring 40. Furthermore, both swivels and flexible hoses may be utilized, and depending upon the function of the fluid-handling lines making up the articulated riser 10 of the present invention, a combination of swivels and flexible hoses may be preferred.

Figure 5:
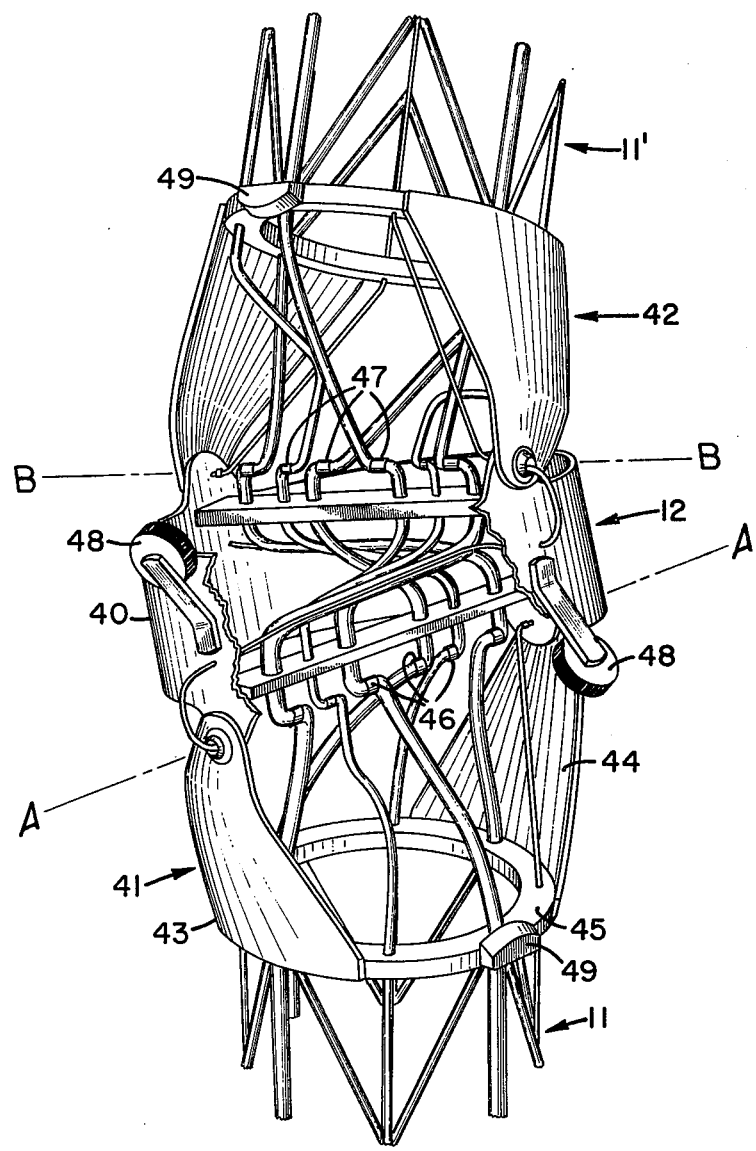
FIG. 5 is another embodiment of a multiple fluid-handling line flexible joint.

Also shown in the embodiment of FIG. 5 are stops 48 and stop surfaces 49. The purpose of the stops 48 is to limit the amount any one joint may flex. The use of stops 48 may be desirable, especially between the lowest framed structures 11, so as to prevent a number of the lowest framed structures 11 from lying on the subsea floor. Furthermore, where flexible hoses are used, it is desirable to maintain the fluid-handling lines with bends having large radii of curvature to prevent damage and to enable the easy passage of pigs or equipment, if such are used. The use of a stop may be included in the embodiment of FIG. 4.

The nature and object of the present invention having been completely described and illustrated, and the best modes thereof completely set forth, what we wish to claim as new and useful and secure by Letters Patent is:

1. An articulated marine riser apparatus comprising:
   a. at least two elongate structures situated in end-to-end relation and arranged in a substantially vertical orientation, each said structure including at least three rigid, fluid-handling lines that are rigidly affixed thereto and extend the length thereof;
   b. a universal joint connecting each adjacent pair of elongate structures, each said joint serving to transfer axial loads between the adjacent structures and including a pair of transverse flexural axes to permit omnidirectional flexure;
   c. at least three flexible fluid-handling lines that interconnect corresponding rigid, fluid-handling lines situated in the adjacent elongate structures;
   d. a foundation structure situated on the floor of a body of water; and
   e. a universal joint interconnecting said foundation structure and the lowermost elongate structure.

2. The apparatus of claim 1 wherein said foundation structure is comprised of a self-standing riser.

3. The apparatus of claim 1 wherein said rigid fluid-handling lines serve as load-bearing members within said elongate structures.

4. An articulated marine riser apparatus comprising:
   a. at least two elongate structures situated in end-to-end relation and arranged in a substantially vertical orientation, each said structure including at least three rigid, fluid-handling lines that are rigidly affixed thereto and extend the length thereof;
   b. a universal joint connecting each adjacent pair of elongate structures, each said joint serving to transfer axial loads between the adjacent structures and including a pair of transverse flexural axes to permit omnidirectional flexure;
   c. at least three flexible hoses that interconnect corresponding rigid, fluid-handling lines situated in the adjacent elongate structures;
   d. means situated in each said joint interconnecting adjacent elongate structures for restraining lateral movement of the hoses extending thereacross;
   e. a foundation structure situated on the floor of a body of water; and
   f. a universal joint interconnecting said foundation structure and the lowermost elongate structure.

5. An articulated riser according to claim 4 wherein said flexible hoses are spiraled through said joint to connect a rigid, fluid-handling line of one structure to a rigid, fluid-handling line of the other structure geometrically opposite.

6. The apparatus of claim 5 wherein said foundation structure is comprised of a self-standing riser.

7. An articulated marine riser apparatus comprising:
   a. at least two elongate structures situated in end-to-end relation and arranged in a substantially vertical orientation, each said structure including at least three rigid, fluid-handling lines that are rigidly affixed thereto and extend the length thereof;
   b. a universal joint connecting each adjacent pair of elongate structures, each said joint serving to transfer axial loads between the adjacent structures and including a pair of transverse flexural axes to permit omnidirectional flexure;
   c. at least three flexible fluid-handling lines comprised of swivels in combination with rigid fluid-handling lines that interconnect corresponding rigid, fluid-handling lines situated in the adjacent elongate structures;
   d. a foundation structure situated on the floor of a body of water; and
   e. a universal joint interconnecting said foundation structure and the lowermost elongate structure.

8. The apparatus of claim 7 wherein the said swivels in combination with rigid fluid-handling lines are comprised of a pair of swivels interconnected by rigid fluid-handling lines, the axis of rotation of each said swivel being aligned with one of the transferse flexural axis of the said joint.

9. The apparatus of claim 8 wherein said foundation structure is comprised of a self-standing riser.

* * * * *